(12) United States Patent
Eberhart et al.

(10) Patent No.: US 10,363,915 B2
(45) Date of Patent: Jul. 30, 2019

(54) PNEUMATIC BRAKE BOOSTER COMPRISING A METAL-COATED BOOSTER HOUSING

(71) Applicant: Continental Teves AG & Co. oHG, Frankfurt (DE)

(72) Inventors: Rene Peter Eberhart, Oberursel (DE); Jürgen Faller, Kahl (DE); Ralf Jakobi, Flösheim (DE); Ilja Prygunkov, Mainz (DE); Andreas Weiss, Bad Soden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/780,406

(22) PCT Filed: Dec. 6, 2016

(86) PCT No.: PCT/EP2016/079957
§ 371 (c)(1),
(2) Date: May 31, 2018

(87) PCT Pub. No.: WO2017/102464
PCT Pub. Date: Jun. 22, 2017

(65) Prior Publication Data
US 2018/0370510 A1    Dec. 27, 2018

(30) Foreign Application Priority Data

Dec. 17, 2015    (DE) .......................... 10 2015 225 832

(51) Int. Cl.
*F16J 3/02*        (2006.01)
*B60T 13/567*    (2006.01)
(Continued)

(52) U.S. Cl.
CPC .............. *B60T 13/567* (2013.01); *C23C 2/02* (2013.01); *C23C 2/06* (2013.01); *C23C 2/26* (2013.01);
(Continued)

(58) Field of Classification Search
CPC .... C23C 2/02; C23C 2/06; C23C 2/26; C23C 2/34; F16J 3/02; B60T 13/567; B60T 13/565
See application file for complete search history.

(56) References Cited

U.S. PATENT DOCUMENTS 4,571,942 A    2/1986 Carre et al.
4,976,998 A    12/1990 Morimitu et al.
(Continued)

FOREIGN PATENT DOCUMENTS

DE        19905782 A1    8/2000
DE    102005061353 A1    1/2007

OTHER PUBLICATIONS

International Preliminary Report on Patentability and Written Opinion for International Application No. PCT/EP2016/079957 dated Jun. 19, 2018, 6 pages.

(Continued)

*Primary Examiner* — Abiy Teka
(74) *Attorney, Agent, or Firm* — RatnerPrestia

(57) ABSTRACT

A pneumatic brake booster in which, for improving the sealing and simplifying the assembly of sealing elements, it is proposed that the booster housing in the bearing region of at least one sealing element has a metal coating having a surface roughness Ra>1.2.

10 Claims, 2 Drawing Sheets

(51) Int. Cl.
  *C23C 2/02* (2006.01)
  *C23C 2/06* (2006.01)
  *C23C 2/26* (2006.01)
  *C23C 2/34* (2006.01)
  *C23C 2/40* (2006.01)
  *C23C 28/00* (2006.01)

(52) U.S. Cl.
  CPC .................. *C23C 2/34* (2013.01); *C23C 2/40* (2013.01); *C23C 28/00* (2013.01); *F16J 3/02* (2013.01)

(56) References Cited

U.S. PATENT DOCUMENTS

| | | | |
|---|---|---|---|
| 6,481,330 B1 * | 11/2002 | Jakobi | B60T 13/5675 91/376 R |
| 6,928,918 B2 * | 8/2005 | Verbo | B60T 13/569 91/376 R |
| 7,048,342 B1 | 5/2006 | Hurlbutt | |
| 7,322,269 B2 * | 1/2008 | Faller | B60T 13/567 91/376 R |
| 7,938,056 B2 * | 5/2011 | Faller | F16J 3/02 92/98 R |

OTHER PUBLICATIONS

International Search Report and Written Opinion for International Application No. PCT/EP2016/079957, dated Apr. 11, 2017, 7 pages.
German Search Report for German Application No. 10 2015 225 832.7, dated Jun. 1, 2017, including partial English translation, 8 pages.

* cited by examiner

PNEUMATIC BRAKE BOOSTER COMPRISING A METAL-COATED BOOSTER HOUSING

CROSS REFERENCE TO RELATED APPLICATIONS

This application is the U.S. National Phase Application of PCT International Application No. PCT/EP2016/079957, filed Dec. 6, 2016, which claims priority to German Patent Application No. 10 2015 225 832.7, filed Dec. 17, 2015, the contents of such applications being incorporated by reference herein.

FIELD OF THE INVENTION

The invention relates to a pneumatic brake booster for a hydraulic motor vehicle brake system.

BACKGROUND OF THE INVENTION

Brake boosters of this type are widely used and known. The booster housing of a brake booster of this type in most instances has at least two thin-walled housing shells which are interconnected or intercoupled. Sealing elements which in braking operation are dynamically stressed are disposed between the housing shells and at further locations on the booster housing. The housing shells are in most instances made from a cost-effective, readily formable but corroding thin-walled steel sheet by deep-drawing methods and have to be protected against corrosion.

A so-called cathodic dip-paint coating is widely known as an corrosion protection. This is a paint layer that is applied to deep-drawn and cleaned housing shells by means of a catalytic dipping method. A paint coating of this type has a relatively smooth surface of $Rz \cong 6.3$; $Ra \cong 1.2$.

In the case of known brake boosters, a number of precautionary measures have to be taken in order to ensure a functionally decisive, permanently reliable sealing in particular in the case of dynamically stressed sealing elements. A solid sealing bead thus has to be provided, for example, in the case of a rolling diaphragm, said solid sealing bead being jammed in a special molding having tight tolerances, i.e. the seal seat, in the housing shells in order for any slipping out, so-called unseating, to be prevented when in operation. At the same time, the rolling diaphragm prior to the assembly has to be pretreated with a separating agent such as talcum, or the like, in order for any undesirable adhesion and the faulty positioning associated therewith to be avoided during assembly. However, the separating agent when in operation increases the risk of the diaphragm slipping out from between smooth painted housing shells.

At the same time, work in the assembling of the brake booster and in particular in the assembly of sealing elements has to be performed very carefully, since the paint layer can be damaged by mechanical influences such as impacts or scratches such that said paint layer flakes at some locations in the sealing region or corrosion is facilitated, the paint layer on account thereof being released from the steel sheet. Leakages which can lead to a reduction in the booster force and therefore are to be avoided can be created on account thereof.

SUMMARY OF THE INVENTION

Thus, an aspect of the invention aims to provide an improved brake booster in which the sealing in particular is permanently improved and the assembly of sealing elements is simplified.

BRIEF DESCRIPTION OF THE DRAWINGS

The details and advantages of aspects of the invention will be explained in more detail hereunder by means of descriptions of the figures. In this context, the description of generally known aspects and functions of a brake booster of the generic type will be largely dispensed with, and only the details which are relevant to aspects of the invention will be discussed.

In detail.

DETAILED DESCRIPTION OF THE PREFERRED EMBODIMENTS

FIG. 1

Figure 1:
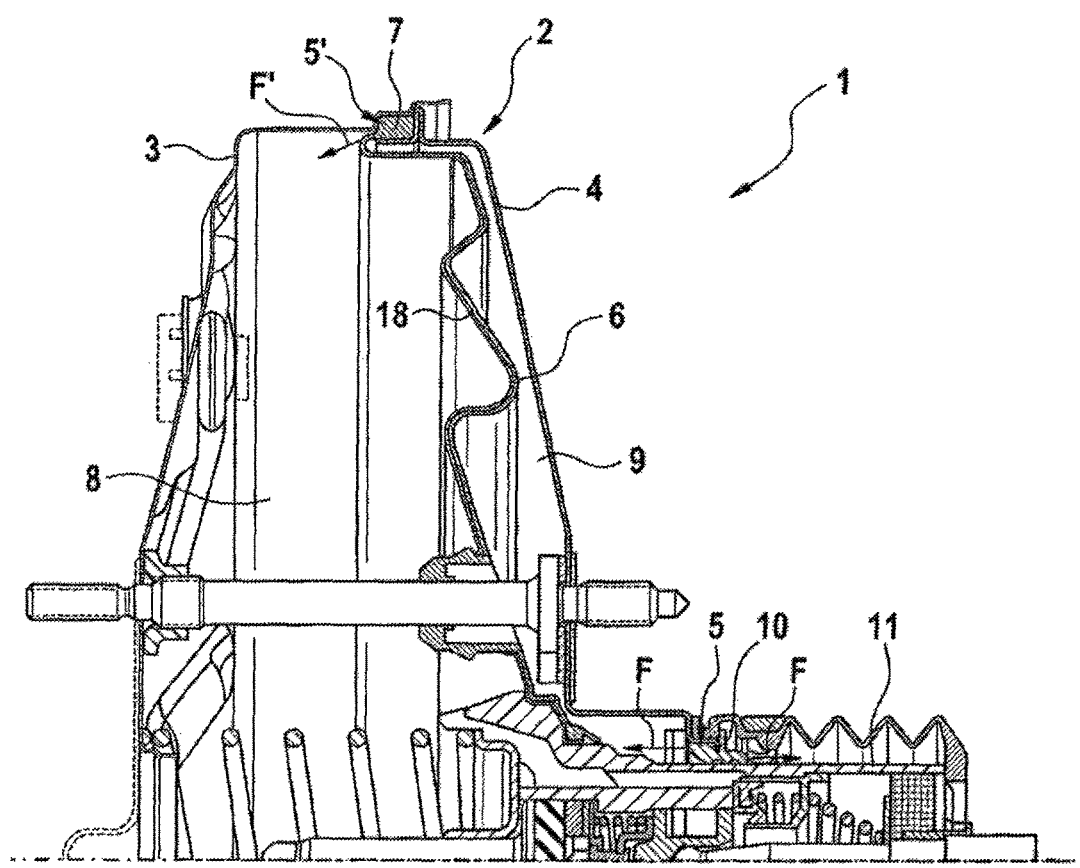
FIG. 1 in an exemplary manner shows an illustration of an axial section of an embodiment of the single brake booster according to an aspect of the invention.
Figure 2:
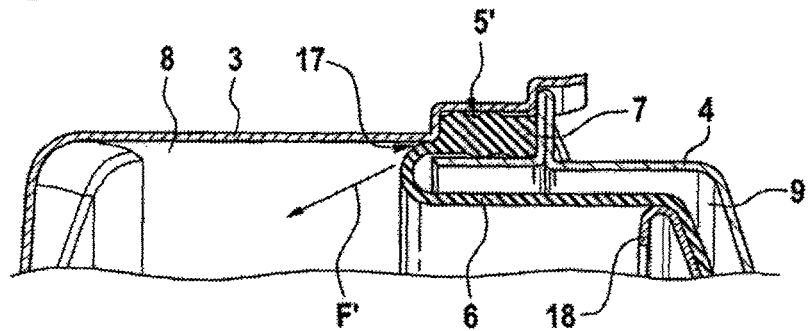
FIG. 2 shows an enlarged view of a sealing location, relevant to an aspect of the invention, of the embodiment as per FIG. 1.

A pneumatic brake booster 1 has a thin-walled booster housing 2. The booster housing 2 comprises housing shells 3 and 4 which are deep-drawn from steel sheet and which in the radial external region thereof are interconnected, in most instances by bending or placing peripheral regions or tabs of one of the housing shells around the periphery or a molded flange on the other housing shell.

The booster force in the pneumatic brake booster 1 is generated by the pressure differential between a vacuum chamber 8 and an operating chamber 9. To this end, a vacuum is first built up in the vacuum chamber 8 and in the operating chamber 9, said vacuum in the operating chamber 9 for generating the pressure differential being adapted entirely or partially, depending on requirements, to the atmospheric pressure of an atmosphere surrounding the brake booster 1. The pressure differential acts on the face of a wall 18 which is coupled to a further component 11 and conjointly with the latter is received so as to be linearly displaceable in the booster housing 2. The component 11 in the embodiment shown is configured as a sleeve-shaped control housing which slides on an elastic sealing element 10 that is fixedly held on the booster housing 2. The sealing element 10 serves for sealing the operating chamber 9 in relation to the surrounding atmosphere. Since the sliding action of the component 11 does not take place in a frictionless manner, a tensile force F which attempts to push the sealing element out of the seat thereof in the booster housing 2 acts in the respective sliding direction on the sealing element 10.

The vacuum chamber 8 is pneumatically delimited from the operating chamber 9 by an elastomeric rolling diaphragm 6 that in regions bears on the wall 18. The rolling diaphragm 6 on the radial external periphery thereof has a molded bead 7 which as a sealing element 5' is jammed between the housing shells 3 and 4. In the operation of the booster, the rolling diaphragm by the pressure differential is drawn in the direction of the vacuum chamber on account of which a tensile force F' that is directed into the interior of the booster housing 2 acts on the bead 7.

FIG. 2

In order to prevent the bead 7 from slipping put when stressed by the tensile force F', the housing shells 3 and 4 are molded in such a manner that an annular gap 17 is formed therebetween, the width of said annular gap 17 being smaller than the thickness of the bead 7.

A heavy dynamic stress on the rolling diaphragm 6, for example in the case of a full brake application, can lead to a correspondingly high tensile force F'. The elastic sealing element 5' in this case is compressed and drawn into the annular gap 17. Smooth surfaces in the bearing region of the sealing element 5' and a separating agent 16 that is applied to the rolling diaphragm (cf. FIG. 3A) reduce the adhesion and facilitate slipping-out of the sealing element 5'.

FIGS. 3A-3B

Figure 3A:
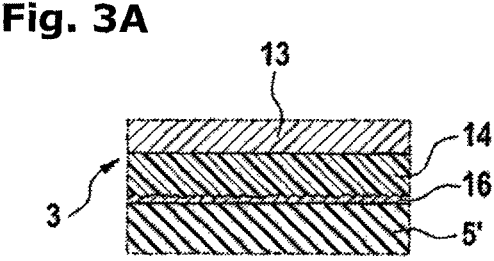
FIGS. 3A-3B show simplified schematic illustrations of a known sealing region (a), and of a sealing region (b) embodied according to an aspect of the invention.

The set of problems in the case of known brake boosters 1 is highlighted by means of FIG. 3A. A paint coating 14 that is applied to the steel sheet 13 has a relatively smooth surface having roughness values of Rz≅6.3; Ra≅1.2. At the same time, the elastomeric material of the sealing element 5' is covered with a layer of a separating agent 16. The separating agent substantially reduces the adhesion tendency of the elastomeric material on adjacent surfaces and inter alia serves for simplifying the assembly because, for example, the bead 7 on account thereof can more readily slide into the position envisaged for the latter in the corresponding molding in the housing shell 3, reducing the risk of a faulty positioning. However, the overall adhesion between the housing shell 3 and the sealing element 5' is reduced on account thereof. Consequently, the bead 7 has to be configured so as to be relatively thick and the housing shells 3, 4 have to be configured with relatively tight tolerances in order to resist a high tensile force F'.

Figure 3B:
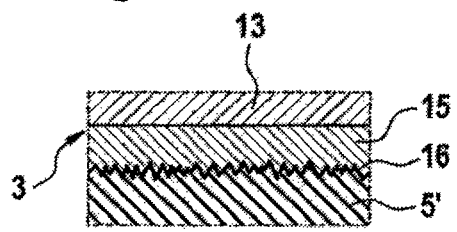

The housing shell 3 embodied according to an aspect of the invention in FIG. 3B has a metal coating 15 instead of a paint coating 14. By contrast to the paint coating 14, the metal coating 15 is applied to the steel sheet 13 prior to the housing shell 3 being fabricated and for technological reasons has a surface roughness that is increased in relation to that of a paint coating 14. This rougher surface of the metal coating 15 can be utilized for an improved adhesion of the sealing element 5' in the bearing region thereof on the housing shell 3. In the assembled state, the adhesion between the housing shell 3 and the sealing element 5' under the influence of the contact pressure per unit area is massively improved on account of the penetration of the surface peaks into the material of the sealing element 5'. On account thereof, a comparatively large part of the tensile force F' is introduced into the housing shells 3, 4, and any slipping-out of the bead 7 through the annular gap 17 is impeded.

At the same time, the higher surface roughness in the absence of a contact pressure per unit area invariably reduces the adhesion tendency of the elastomeric material on adjacent surfaces in a natural manner, on account of which the assembly process is facilitated and designed to be more reliable, and the separating agent 16 can be entirely dispensed with or at least the quantity of the latter can be substantially reduced.

The production of the housing shells 3, 4 with greater tolerances and, on account thereof, using simpler tools and processes, can be performed in a more cost-effective manner. The bead 7 can be embodied so as to be smaller.

The housing shells 3, 4 are preferably provided entirely and not only in the bearing region of the sealing elements 5, 5' with the metal coating 15. On account thereof, the production of the housing shells 3, 4 improved according to an aspect of the invention is simplified and the corrosion protection of the housing shells 3, 4 as a side effect can at the same time likewise be assumed by the metal coating 15, additional painting not being required.

In principle, zinc or zinc-containing metal coatings by virtue of the surface properties and the anti-corrosion effect thereof are suitable for the purpose envisaged. An alloy which besides zinc additionally contains aluminum and magnesium, preferably in proportions of 3.5% Al and 3% Mg, is suitable as a particularly preferred metal coating. An alloy of this type permanently has a particularly high corrosion protection and very high mechanical resilience.

A metal coating of this type is applied in an immersion melt method to the steel sheet 13 that is provided for generating housing shells 3, 4, and invariably and without any post-processing has a surface roughness Rz in the range of approx. 9.5 and Ra in the range of approx. 1.8. This surface roughness is higher than in the case of the usual paint coating 14 but is not so coarse that there would be any risk in terms of reliable sealing, thus being in the optimal range of values in the context of the object set.

Surprisingly, further advantages are derived from the use of the metal coating proposed.

The steel sheet 13 for the production of housing shells 3, 4 can already be deep-drawn in the coated state. When choosing a suitable surface pretreatment, in particular a dry passivation instead of oil, no post-treatment whatsoever, such as for example degreasing and washing, of the housing shells 3, 4 will be required for the downstream assembly of the brake booster 1. On account thereof, the overall production process can be designed so as to be significantly more cost-effective.

Moreover, the metal coating 15 proposed has a coefficient of friction that is lower in relation to that of galvanized metal coatings, this simplifying the deep-drawing.

Cutting edges which are created by punching or perforating are invariably covered directly in the production by a metal coating 15 that is entrained from the surface by the tool and are thus protected against corrosion.

In the case of paint coatings 14 there is the risk of the paint layer being damaged at some locations during production, assembly, or in operation, and of the steel sheet 13 not being protected and corroding at these locations. This can arise, for example, by mechanical influences such as sheet-metal deformation, bending back of tabs, scratches, on edges subjected to bending stress, in the case of inadequate painting on edges, by painting errors such as exposed areas.

On account of the metal coating 15 being used on entire housing shells 3, 4, the cracks and exposed areas therein are closed in a self-acting manner by the formation of zinc salts. The permanent corrosion protection of the brake booster 1 according to an aspect of the invention is improved, and the like-new visual appearance of said brake booster 1 according to an aspect of the invention is maintained, on account thereof.

FIG. 4

Figure 4:
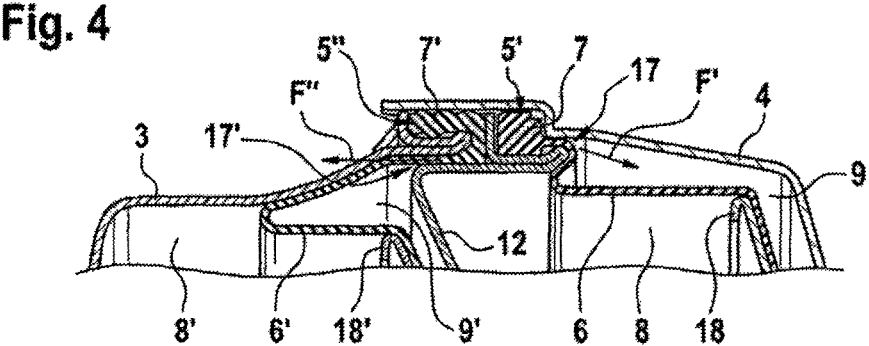
FIG. 4 shows an enlarged view of a sealing location, relevant to an aspect of the invention, in a tandem brake booster.

An application case study according to an aspect of the invention is shown on a brake booster 1 of the tandem construction type in FIG. 4.

A tandem brake booster 1 has in each case two vacuum chambers 8, 8', two operating chambers 9, 9', and two rolling diaphragms 6, 6', on account of which there are also two sealing elements 5', 5" which have to ensure pneumatic separation of the respective vacuum and operating chambers and at the same time the sealing in relation to the atmosphere.

An intermediate wall 12 is in this case disposed between the housing shells 3, 4 in such a manner that the sealing element 5" between the housing shells 3, 4 and the intermediate wall 12 bears thereon in a sealing manner, whereas the sealing element 5' bears in a sealing manner on the intermediate wall 12 and the housing shell 4.

The intermediate wall 12 is embodied according to an aspect of the invention so as to be covered with the metal coating 15 in the bearing region of the sealing elements (5', 5") and in one preferred embodiment so as to be covered completely with said metal coating 15.

LIST OF REFERENCE SIGNS

1 Brake booster
2 Booster housing
3 Housing shell
4 Housing shell
5 Sealing element
6 Rolling diaphragm
7 Sealing bead
8 Vacuum chamber
9 Working chamber
10 Sealing element
11 Component
12 Intermediate wall
13 Steel sheet
14 Paint coating
15 Metal coating
16 Separating agent
17 Annular gap
18 Wall
F Tensile force

The invention claimed is:

1. A pneumatic brake booster comprising:
a booster housing having at least two housing shells which are produced from steel sheet;
at least one elastic sealing element which, for sealing in relation to an atmosphere surrounding the brake booster, bears in a pneumatically sealing manner on the booster housing,
wherein the booster housing, in a bearing region of the at least one sealing element, has a metal coating having a surface roughness Ra>1.2.

2. The brake booster as claimed in claim 1, wherein the metal coating contains zinc.

3. The brake booster as claimed in claim 2, wherein the metal coating contains aluminum.

4. The brake booster as claimed in claim 2, the metal coating contains magnesium.

5. The brake booster as claimed in claim 1, wherein the metal coating is applied by an immersion melt method.

6. The brake booster as claimed in claim 1, wherein at least one of the at least two housing shells is covered completely by the metal coating.

7. The brake booster as claimed in claim 6, wherein the sealing element is disposed so as to be jammed in a pneumatically sealing manner between the housing shells.

8. The brake booster as claimed in claim 1, wherein the sealing element is configured as a sealing bead that is molded to a radial external periphery of an elastomeric rolling diaphragm, wherein the rolling diaphragm in the booster housing delimits at least one vacuum chamber in relation to an operating chamber.

9. The brake booster as claimed in claim 1, wherein the sealing element is configured as a sealing element that is fixedly held on the booster housing, said sealing element being configured for pneumatically sealing in relation to a component that is displaceable in a linear manner.

10. The brake booster as claimed in claim 1, wherein an intermediate wall is disposed between the at least two housing shells in such a manner that in each case one sealing element is disposed between one of the at least two housing shells and the intermediate wall, and between the intermediate wall and an other one of the at least two housing shells, and the intermediate wall in bearing regions of the sealing elements has a metal coating having the surface roughness Ra>1.2.

* * * * *